US008571009B2

(12) United States Patent
Hong et al.

(10) Patent No.: US 8,571,009 B2
(45) Date of Patent: Oct. 29, 2013

(54) TRANSMITTER AND METHOD FOR TRANSMITTING AND RECEIVING OF VOICE DATA FOR VOIP SERVICE

(75) Inventors: Eon Young Hong, Daejeon (KR); Jun-Woo Kim, Daejeon (KR); Youn Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1125 days.

(21) Appl. No.: 12/533,982

(22) Filed: Jul. 31, 2009

(65) Prior Publication Data

US 2010/0157982 A1 Jun. 24, 2010

(30) Foreign Application Priority Data

Dec. 18, 2008 (KR) .................. 10-2008-0129457

(51) Int. Cl.
*H04L 5/12* (2006.01)
(52) U.S. Cl.
USPC .......................................... 370/351; 370/473
(58) Field of Classification Search
None
See application file for complete search history.

(56) References Cited

U.S. PATENT DOCUMENTS

| 6,169,504 B1 * | 1/2001 | Park ............................ 341/141 |
| 6,618,095 B1 * | 9/2003 | Takeuchi et al. ............. 348/476 |
| 7,035,250 B2 * | 4/2006 | Lai et al. ....................... 370/352 |
| 7,983,720 B2 * | 7/2011 | Chen ........................... 455/575.1 |
| 2002/0054586 A1 * | 5/2002 | Hoffmann ...................... 370/352 |
| 2004/0081106 A1 * | 4/2004 | Bruhn .......................... 370/276 |
| 2004/0160940 A1 * | 8/2004 | Kim ............................. 370/349 |
| 2006/0133622 A1 * | 6/2006 | Chen .............................. 381/92 |
| 2007/0248073 A1 * | 10/2007 | Pattavina et al. ............. 370/345 |
| 2009/0111507 A1 * | 4/2009 | Chen ........................... 455/550.1 |

FOREIGN PATENT DOCUMENTS

KR    10-2006-0010162 A    2/2006

OTHER PUBLICATIONS

Smith, Steven. "The Scientist and Engineer's Guide to Digital Signal Processing," 2nd Edition, 1999.*

* cited by examiner

*Primary Examiner* — Chirag Shah
*Assistant Examiner* — Jenkey Van
(74) *Attorney, Agent, or Firm* — Jefferson IP Law, LLP

(57) ABSTRACT

Provided are a transmitting apparatus and voice data transmitting and receiving methods for providing VoIP services. When a call is started and an analog signal including a voice signal is input, the transmitting apparatus divides the analog signal into a plurality of voice data packets for transmission. Here, the plurality of voice data packets are generated by sampling with different phases in the same frequency. In addition, the transmitting apparatus inserts a time indication bit that is changed every transmission period into each of the voice data packets and transmits the voice data packets, and distinguishes voice data corresponding to a current transmission period based on the time indication bit.

11 Claims, 5 Drawing Sheets

TRANSMITTER AND METHOD FOR TRANSMITTING AND RECEIVING OF VOICE DATA FOR VOIP SERVICE

CROSS-REFERENCE TO RELATED APPLICATION

This application claims priority to and the benefit of Korean Patent Application No. 10-2008-0129457 filed in the Korean Intellectual Property Office on Dec. 18, 2008, the entire contents of which are incorporated herein by reference.

BACKGROUND OF THE INVENTION (a) Field of the Invention

The present invention relates to a transmitting apparatus and voice data transmitting and receiving methods for providing voice over Internet protocol (VoIP) services.

(b) Description of the Related Art

A voice over Internet protocol (hereinafter referred to as a VoIP) that provides a voice call service through a high speed Internet network provides a call service that is cheaper than an existing call service to a user. In addition, as an All-IP-based wireless Internet technique has been developed, a wide spread of a mobile VoIP service that is similar to an existing mobile phone service is expected.

When a VoIP service is provided through a packet network, data integrated with voice is divided into a packet unit and transmitted to an IP address that is predetermined through an optimal path selected by a router, and therefore lines are occupied only when packets are transmitted. Therefore, it is more beneficial to use a packet network that enables efficient use of frequency resources than to use an existing socket network that occupies fixed lines in a transmitting side and a receiving side for providing the VoIP service.

In order to provide a reliable VoIP service in the packet network, reordering, delay, and loss of voice data packets should be minimized and unidirectional end-to-end delay should be minimized. The delay includes transmission delay and processing delay, and the transmission delay implies delay that occurs in the network, and the processing delay, also referred to as serialization delay, occurs due to devices that process voice signals through a transmission path. The processing delay may cause a problem when providing the VoIP service in the packet network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmitting apparatus and voice data transmitting and receiving methods for providing reliable VoIP services in a packet network.

A voice data transmission method for providing a VoIP service according to an exemplary embodiment of the present invention includes: when a voice signal is detected from an input analog signal, sampling the analog signal to a plurality of signals with different phases in the same frequency; converting the plurality of sampled signals to a plurality of digital signals; generating a plurality of voice data packets by modulating the plurality of digital signals; and inserting the plurality of voice data packets in a transmission frame and transmitting the transmission frame.

A voice data receiving method for providing a VoIP service according to another exemplary embodiment of the present invention includes: receiving a plurality of voice data packets, each having a time indication bit that is changed every transmission period inserted therein; storing first voice data demodulated from a first voice data packet of which a time indication bit inserted therein corresponds to a current transmission period among the plurality of voice data packets in a first buffer; storing second voice data demodulated from a second voice data packet of which a time indication bit inserted therein is different from the current transmission period and is received after a reference time among the plurality of voice data packets in a second buffer; interpolating the voice data stored in the first buffer; converting the interpolated voice data into an analog signal; and outputting a voice signal by filtering the analog signal.

A transmitting apparatus for providing a VoIP service according to another exemplary embodiment of the present invention includes: a voice signal detection unit that detects a voice signal from an input analog signal; a plurality of sampling units that output a plurality of sampled signals that are sampled with different phases in the same frequency from the analog signal when the voice signal is detected in the voice signal detection unit; an analog to digital converter (ADC) that converts the plurality of sampled signals to digital signals and outputs a plurality of voice data; and a plurality of modulators that modulate the plurality of voice data and output a plurality of voice data packets.

DETAILED DESCRIPTION OF THE EMBODIMENTS

Figure 1:
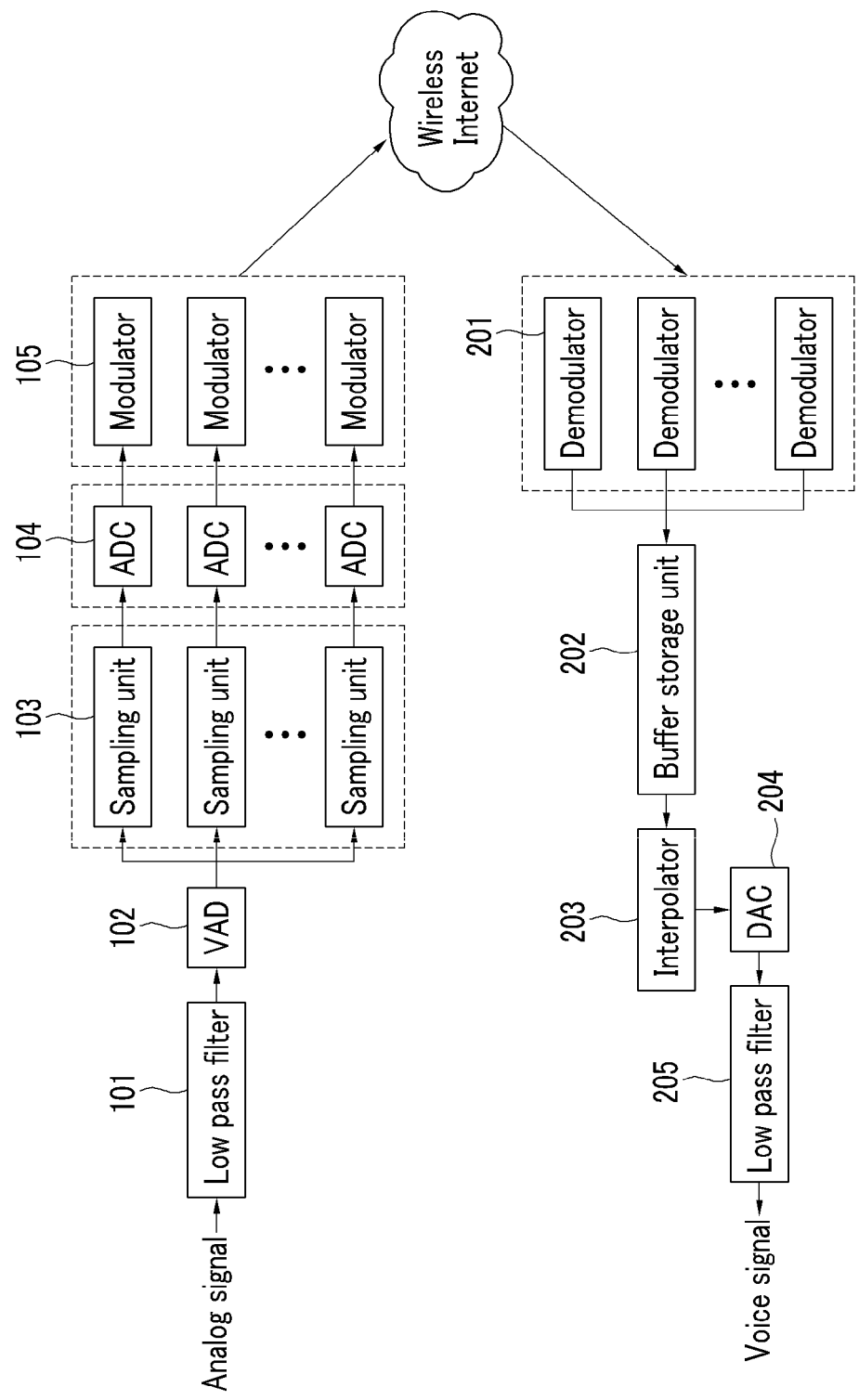
FIG. 1 is a configuration diagram of a transmitting/receiving system for providing a VoIP service according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a transmitting apparatus for providing a VoIP service and voice data transmitting and receiving methods according to exemplary embodiments of the present invention will be described in further detail with reference to the drawings.

FIG. 1 is a configuration diagram of a transmitting/receiving system for providing a VoIP service according to an exemplary embodiment of the present invention.

Referring to FIG. 1, a transmitting apparatus 100 of a transmitting/receiving system according to an exemplary embodiment of the present invention includes a low pass filter 101, a voice activity detector (VAD) 102, a plurality of sampling units 103, a plurality of analog to digital converters (ADCs) 104, and a plurality of modulators 105.

When a call is started and an analog signal is input, the low pass filter 101 outputs a signal in a desired frequency band, that is, a frequency band corresponding to a voice signal, through filtering.

The VAD 102 detects a voice signal from the signal output from the low pass filter 101, and changes a time indication bit when the voice signal is not detected.

When the VAD 102 detects a voice signal, the plurality of sampling units 103 sample the signal output from the low pass filter 101 based on a sampling frequency and a sampling period, which are system parameters and sampled output signals. The number of sampling units 103 included in the transmitting apparatus 100 is determined by the number of voice data packets that are generated for each sampling period, and the plurality of sampling units 102 output a plurality of sampled signals that are respectively sampled with difference phases in the same frequency.

In the transmitting apparatus 100 according to the exemplary embodiment of the present invention, one sampling period is divided by the number of voice data packets generated at each sampling period to set the phase differences between the respective sample units 103.

For example, when four voice data packets are generated at every single sampling period, the transmitting apparatus 100 includes four sampling units 103, and each sampling unit 103 performs sampling by shifting a phase by a value obtained by dividing a sampling period ($2\pi$) by 4, that is, $\frac{1}{2}\pi$. That is, the first sampling unit performs sampling with phase 0, the second sampling unit performs sampling with a $\frac{1}{2}\pi$-shifted phase, the third sampling unit performs sampling with a $\pi$-shifted phase, and the fourth sampling unit performs sampling with a $3/2\pi$-shifted phase.

Each ADC 104 converts the sampled signal output from the corresponding sampling unit 103 to voice data in a digital signal format and outputs the voice data, and each modulator 105 modulates the voice data output from the corresponding ADC 104 to a voice data packet and outputs the voice data packet. Here, a time indication bit and a phase indication bit are inserted into the voice data packet output from each modulator 105. A value of the time indication bit is changed every transmission period, and is inserted for distinguishing a transmission period. In addition, the phase indication bit indicates how much each voice data packet is phase-shifted, and is inserted to each voice data packet in a sampling process of it.

The voice data packet output from each modulator 105 is sequentially loaded into a transmission frame and then transmitted through a wireless Internet.

A receiving apparatus 200 according to the exemplary embodiment of the present invention includes a plurality of demodulators 201, a buffer storage unit 202, an interpolator 203, a digital to analog converter (DAC) 204, and a low pass filter 205.

When a call is started, each demodulator 201 receives the transmission through the wireless Internet, demodulates the voice data packet included in the transmission packet, and outputs voice data.

The buffer storage unit 202 sequentially reorders the voice data that is demodulated and output from the respective demodulators 201 and stores the reordered voice data in a buffer (not shown). Here, the buffer storage unit 202 stores voice data corresponding to a current transmission period in a first buffer (not shown) referring to the time indication bits included in the voice data packets. In this case, the buffer storage unit 202 determines a first buffer storing order based on the phase indication bit included in each voice data packet.

When voice data corresponding to a time indication bit that is different from the time indication bit of the current transmission period is received, the buffer storage unit 202 determines that voice data received before a reference time is voice data of the previous transmission period and discards the voice data, and determines that voice data received after the reference time is voice data of the next transmission period and stores the voice data in a second buffer (not shown). As described, delayed voice data of the previous transmission period is discarded so that processing delay can be minimized according to the exemplary embodiment of the present invention.

When a data change time of the voice data corresponding to the current transmission period comes, the interpolator 203 reads voice data stored in the first buffer, interpolates the read voice data, and outputs the interpolated voice data, and the DAC 204 converts the interpolated voice data to an analog signal and outputs the converted signal. The low pass filter 205 filters the analog signal output from the DAC 204 and outputs a voice signal.

Figure 2:
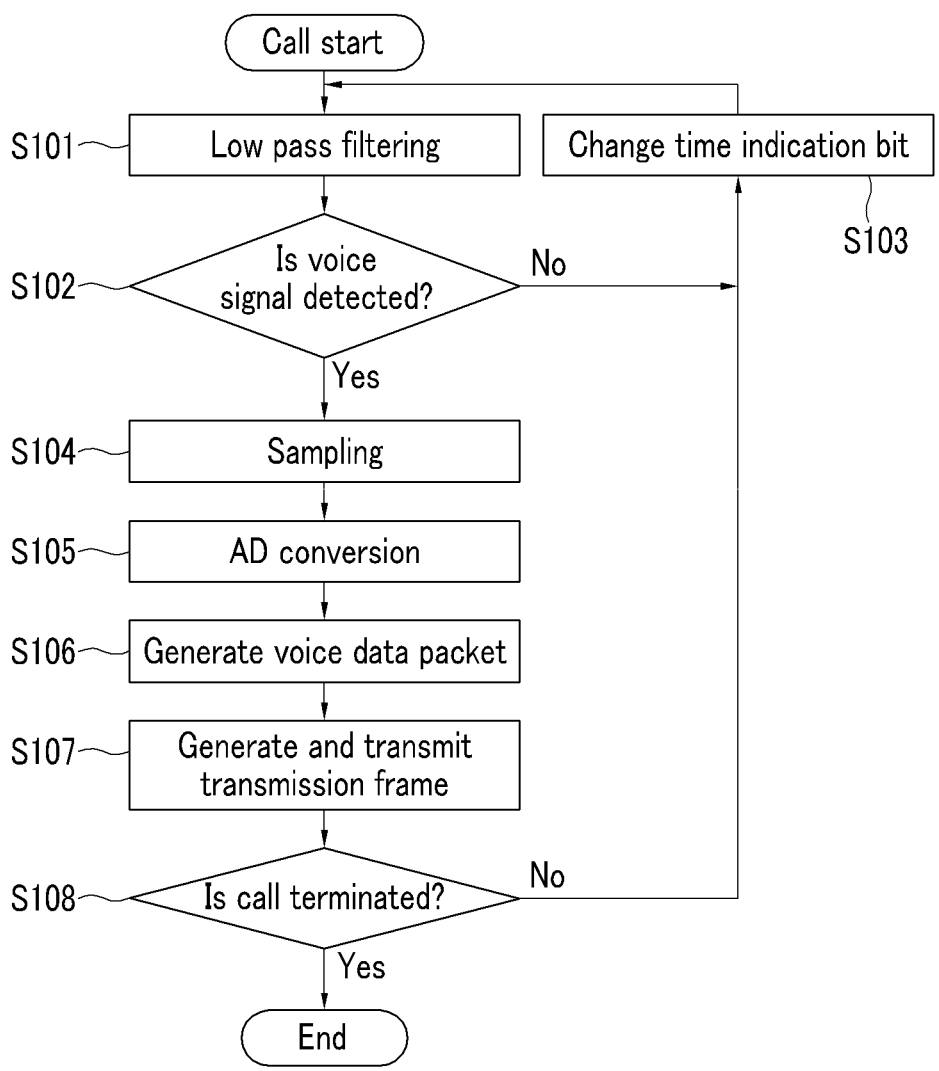
FIG. 2 is a flowchart of a voice data transmitting method according to an exemplary embodiment of the present invention.
Figure 3:
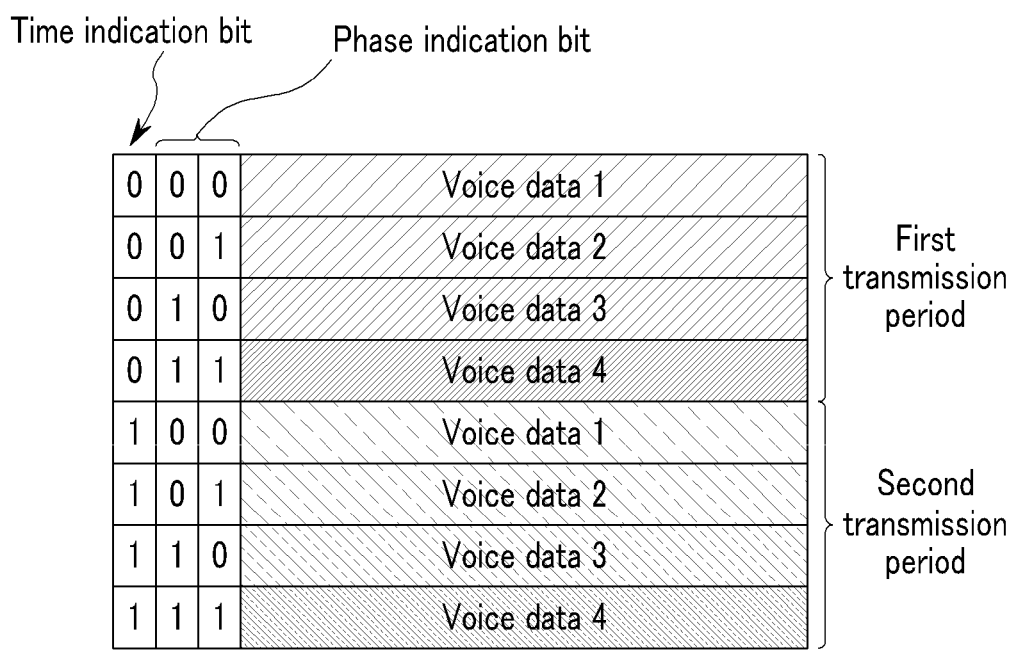
FIG. 3 is an example of a transmission frame according to the exemplary embodiment of the present invention.

FIG. 2 is a flowchart of a voice data transmitting method of the transmitting apparatus according to the exemplary embodiment of the present invention, and FIG. 3 shows an example of a voice data packet according to the exemplary embodiment of the present invention.

Referring to FIG. 2, when the call is started, the transmitting apparatus 100 filters an input analog signal by using the low pass filter 101 and outputs a signal in a desired frequency bandwidth (S101). In addition, the transmitting apparatus 100 detects a voice signal from the signal filtered by the low pass filter 101 by using the VAD 102 (S102).

When a voice signal is not detected, the time indication bit is changed (S103), and when the voice signal is detected, the signal filtered by the low pass filter 101 is sampled (S104). Here, the transmitting apparatus 100 outputs a plurality of sampled signals that are respectively sampled in the same frequency with difference phases by using the plurality of sampling units 103.

The transmitting apparatus 100 converts the plurality of sampled signals to voice data in a digital signal format through the plurality of ADCs 104 (S105), and outputs a plurality of voice data packets by modulating the plurality of voice data output from the plurality of ADCs 104 through the plurality of modulators 105 (S106). Here, the transmitting apparatus 100, as shown in FIG. 3, inserts a time indication bit that corresponds to each transmission period and inserts a phase indication bit that indicates phase shift of a sampling unit 103 that corresponds to each voice data packet when generating a voice data packet.

As described above, when a plurality of voice data packets are generated through the plurality of modulators 105, the transmitting apparatus 100 sequentially combines the plurality of voice data packets to generate a transmission frame and transmits the generated transmission frame through a wireless Internet (S107).

Such a voice data transmission process (S101 to S107) is iteratively performed until the call is terminated (S108), and the time indication bit is changed every transmission period unit the call is terminated (S103). For example, as shown in FIG. 3, when the transmission is finished in the first transmission period, the transmitting apparatus 100 changes the time indication bit from 0 to 1, and the time indication bit that is changed to 1 is inserted to the next transmission period.

As described above, in the exemplary embodiment of the present invention, voice signals during a predetermined time period are divided into a plurality of voice data packets that are sampled with difference phases in the same frequency and then transmitted, and accordingly, call quality of the receiving apparatus 200 can be adaptively improved according to a channel condition. For example, the receiving apparatus 200 receives fewer voice data packets than usual when the channel condition is bad, and accordingly, the receiving apparatus 200 demodulates the received voice data packets and interpolates the demodulated voice data packets to improve call quality and maintain the call.

Figure 4:
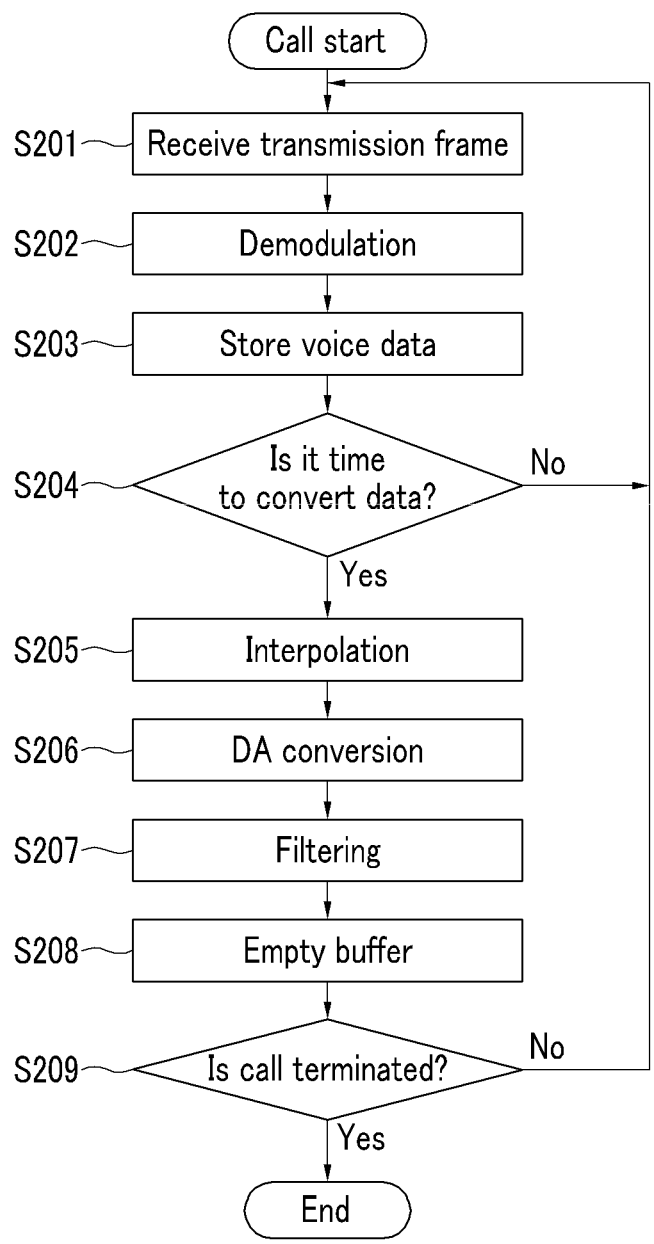
FIG. 4 is a flowchart of a voice data receiving method according to an exemplary embodiment of the present invention.
Figure 5:
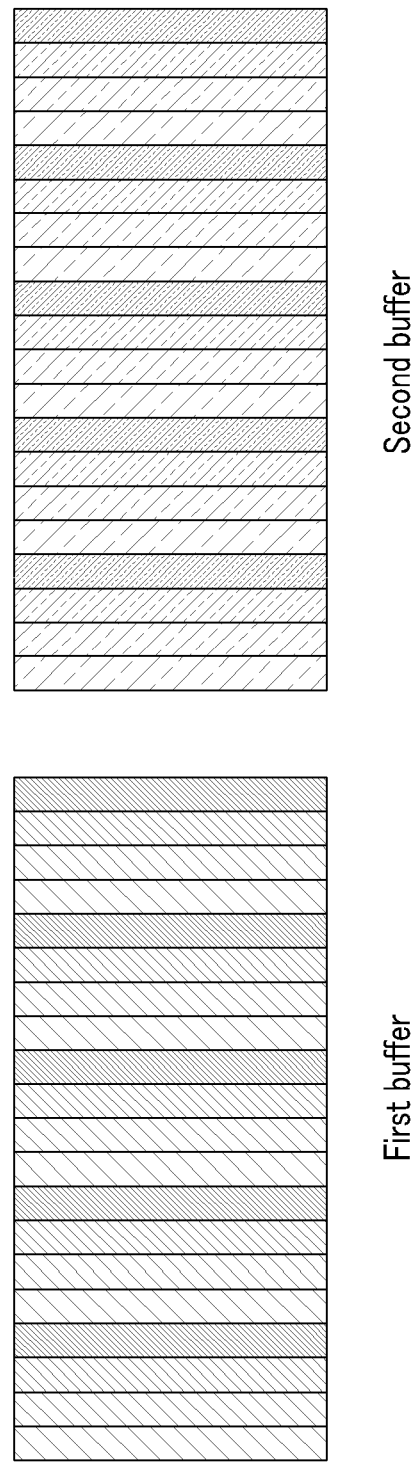
FIG. 5 is an example of buffer storing according to the exemplary embodiment of the present invention.

FIG. 4 is a flowchart of a voice data receiving method of a receiving apparatus according to an exemplary embodiment of the present invention, and FIG. 5 exemplarily shows buffer storing according to the exemplary embodiment of the present invention.

Referring to FIG. 4, when a call is started and a transmission frame is received through a wireless Internet (S201), a receiving apparatus 200 demodulates each of a plurality of voice data packets included in the transmission frame through a plurality of demodulators 201 (S202). In addition, the receiving apparatus 200 stores demodulated voice data in a buffer (S203). Here, a buffer storage unit 202 of the receiving apparatus 200 checks a time indication bit included in each of the voice data packets, and stores voice data corresponding to a current transmission period in a first buffer, as shown in FIG. 5. The receiving apparatus 200 discards or stores voice data corresponding to a time indication bit that is different from the current transmission period in a second buffer, as shown in FIG. 5. That is, the receiving apparatus 200 determines voice data received before a reference time among voice data of different time bits to be voice data of the previous transmission period and discards the voice data, and determines voice data received after the reference time to be voice data of the next transmission period and stores the voice data in the second buffer. According to the exemplary embodiment of the present invention, when storing voice data, a voice data storing location is determined on the basis of a phase indication bit corresponding to each voice data.

The transmission frame receiving process (S201), the demodulation process (S202), and the buffer storing process (S203) are iteratively performed until a data conversion time of voice data corresponding to the current transmission period comes (S204), and when the data conversion time of the voice data corresponding to the current transmission period comes, the receiving apparatus 200 interpolates voice data stored in a current buffer (S205). In addition, the receiving apparatus 200 converts the interpolated data to an analog signal through a DAC 204 (S206), and performs a low pass filtering process on the voice data converted into the analog signal and outputs a voice signal (S207).

As described, when the voice signal conversion is finished, the receiving apparatus 200 empties the first buffer where voice data corresponding to the current transmission period (S208) is stored, and iteratively performs the above-described conversion process S201 to S208 until the call is terminated (S209).

Accordingly, the received voice data storing method of the exemplary embodiment of the present invention enables constant maintenance of the amount of voice data stored in a buffer without regard to transmission delay. In addition, processing delay due to transmission delay can be minimized. Further, voice data are sequentially stored based on a phase indication bit so that a voice data reordering process is not required.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A voice data transmission method for providing a VoIP service, comprising:
   when a voice signal is detected from an input analog signal, sampling the analog signal to a plurality of signals with different phases in a same frequency;
   converting the plurality of sampled signals to a plurality of digital signals;
   generating a plurality of voice data packets by modulating the plurality of digital signals;
   inserting the plurality of voice data packets in a transmission frame and transmitting the transmission frame,
   wherein, in the sampling of the analog signal, a phase difference between the plurality of sampled signals is set to correspond to a value obtained by dividing a sampling period by the number of voice data packets generated every sampling period.

2. The voice data transmitting method of claim 1, wherein the generating of the plurality of voice data packets comprises inserting a phase indication bit that indicates phase shift of the corresponding sampled signal into each of the plurality of data packets.

3. The voice data transmitting method of claim 2, wherein the generating of the plurality of voice data packets further includes inserting a time indication bit used for distinguishing a transmission period into each of the plurality of voice data packets.

4. The voice data transmitting method of claim 3, further comprising changing the time indication bit after the transmitting of the transmission frame.

5. The voice data transmitting method of claim 4, further comprising changing the time indication bit when no voice signal is detected from the input analog signal.

6. A voice data receiving method for providing a VoIP service, comprising:
   receiving a plurality of voice data packets, each having a time indication bit that is changed every transmission period inserted therein;
   storing first voice data demodulated from a first voice data packet of which a time indication bit inserted therein corresponds to a current transmission period among the plurality of voice data packets in a first buffer;
   storing second voice data demodulated from a second voice data packet of which a time indication bit inserted therein is different from the current transmission period and is received after a reference time among the plurality of voice data packets in a second buffer;

interpolating the voice data stored in the first buffer;
converting the interpolated voice data into an analog signal; and
outputting a voice signal by filtering the analog signal.

7. The voice data receiving method of claim 6, wherein each of the plurality of voice data packets includes a phase indication bit that indicates phase shift during a sampling process, and the storing in the first buffer comprises determining a buffer storing location of the first voice data according to the corresponding phase indication bit.

8. The voice data receiving method of claim 6, further comprising emptying the first buffer after the outputting of the voice signal.

9. A transmitting apparatus for providing a VoIP service, comprising:
  a voice signal detection unit that detects a voice signal from an input analog signal;
  a plurality of sampling units that output a plurality of sampled signals that are sampled with different phases in the same frequency from the analog signal when the voice signal is detected in the voice signal detection unit;
  an analog to digital converter (ADC) that converts the plurality of sampled signals to digital signals and outputs a plurality of voice data; and
  a plurality of modulators that modulate the plurality of voice data and generate a plurality of voice data packets, insert the plurality of voice data packets in a transmission frame and transmit the transmission frame,
  wherein, in the sampling of the analog signal, a phase difference between the plurality of sampled signals is set to correspond to a value obtained by dividing a sampling period by a number of voice data packets generated every sampling period.

10. The transmitting apparatus of claim 9, wherein the modulator inserts a time indication bit that is changed every transmission period into each of the voice data packets.

11. The transmitting apparatus of claim 10, wherein the modulator inserts a phase indication bit that indicates phase shift of the plurality of sampled signals into each of the plurality of voice data packets.

* * * * *